(12) United States Patent  (10) Patent No.: US 7,710,580 B2
Deck  (45) Date of Patent: May 4, 2010

(54) VIBRATION RESISTANT INTERFEROMETRY

(75) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 221 days.

(21) Appl. No.: 11/924,688

(22) Filed: Oct. 26, 2007

(65) Prior Publication Data

US 2008/0266571 A1  Oct. 30, 2008

Related U.S. Application Data

(60) Provisional application No. 60/854,917, filed on Oct. 27, 2006.

(51) Int. Cl.
 *G01B 11/02*  (2006.01)
(52) U.S. Cl. ..................................... 356/511
(58) Field of Classification Search ......... 356/511–514, 356/489, 495
See application file for complete search history.

(56) References Cited

U.S. PATENT DOCUMENTS

| | | | |
|---|---|---|---|
| 4,340,306 A | 7/1982 | Balasubramanian | |
| 4,818,110 A | 4/1989 | Davidson | |
| 5,112,129 A | 5/1992 | Davidson et al. | |
| 5,133,601 A | 7/1992 | Cohen et al. | |
| 5,204,734 A | 4/1993 | Cohen et al. | |
| 5,323,012 A | 6/1994 | Auslander et al. | |
| 5,343,294 A | 8/1994 | Kuchel et al. | |
| 5,355,201 A | 10/1994 | Hwang | |
| 5,398,113 A | 3/1995 | De Groot | |
| 5,402,234 A | 3/1995 | Deck | |
| 5,589,938 A | 12/1996 | Deck | |
| 5,777,741 A | 7/1998 | Deck | |
| 6,624,893 B1 * | 9/2003 | Schmit et al. | ............... 356/511 |
| 6,624,894 B2 | 9/2003 | Olszak et al. | |
| 6,822,745 B2 | 11/2004 | De Groot et al. | |
| 6,882,432 B2 | 4/2005 | Deck | |
| 7,106,454 B2 | 9/2006 | De Groot et al. | |
| 7,142,311 B2 | 11/2006 | De Lega | |
| 2004/0189999 A1 | 9/2004 | De Groot et al. | |

(Continued)

OTHER PUBLICATIONS

Luna, Esteban et al., "Deterministic convergence in iterative phase shifting", Applied Optics, vol. 48, No. 8, pp. 1494-1501 (Mar. 10, 2009).

(Continued)

*Primary Examiner*—Tarifur Chowdhury
*Assistant Examiner*—Jonathan M Hansen
(74) *Attorney, Agent, or Firm*—Fish & Richardson P.C.

(57) ABSTRACT

In general, in one aspect, the invention features a method including providing scanning interferometry data for a test object using phase shifting interferometry, the data including intensity values for each of multiple scan positions for different spatial locations of the test object, the intensity values for each spatial location defining an interference signal for the spatial location, the intensity values for a common scan position defining a data set for that scan position. The method also includes temporally transforming at least some of the interference signals into a first frequency domain signal, determining an estimated phase profile of the test object based on the first frequency domain signal, determining phase shifts at multiple scan positions based on the estimated phase profile, and determining a more accurate phase profile of the test object based on the estimated phase profile and the phase shifts.

38 Claims, 14 Drawing Sheets

U.S. PATENT DOCUMENTS

| | | |
|---|---|---|
| 2005/0073692 A1 | 4/2005 | De Groot et al. |
| 2005/0078319 A1 | 4/2005 | De Groot |
| 2005/0237534 A1 | 10/2005 | Deck |
| 2007/0046953 A1 | 3/2007 | De Groot et al. |

OTHER PUBLICATIONS

Bingham, Philip R. et al., "Preliminary results for mask metrology using spatial heterodyne interferometry", 23$^{rd}$ Annual BACUS Symposium on Photomask Technology, vol. 5256, pp. 1331-1342, Dec. 2003.

Bingham, Philip R. et al., "Preliminary results for mask metrology using spatial heterodyne interferometry", 23$^{rd}$ Annual BACUS Symposium on Photomask Technology, vol. 5256, pp. 1331-1342, Dec. 2003 (Abstract).

Bone, D.J., Bachor, H.-A., and Sandeman, R.J., "Fringe-pattern analysis using a 2-D Fourier Transform," Appl. Opt. 25, pp. 1653-1660 (1986).

Deck, L., "Vibration-resistant phase-shifting interferometry," Appl. Opt. 35, 6655-6662 (1996).

De Groot, P. et al., "Step height measurements using a combination of a laser displacement gage and a broadband interferometric surface profiler," *Proceedings of SPIE* vol. 4778, pp. 127-130 (2002).

De Groot, P., Deck, L., Surface Profiling by Analysis of White-Light Interferograms in the Spatial Frequency Domain, J. Mod. Opt., 42 (2), pp. 389-401 (1995).

De Groot, "Vibration in phase shifting interferometry", J. Opt. Soc. Am. A, 12(2), pp. 354-365 (1995).

Goldberg, K., Bokor, J., "Fourier-transform method of phase-shift determination," Appl. Opt. 40(17), pp. 2886-2894 (2001).

Greivenkamp, J., Bruning, J., "Phase Shifting Interferometry", Chap. 14, Optical Shop Testing, 2$^{nd}$ Ed., J. Wiley (1992).

Greivenkamp, J., "Generalized data reduction for heterodyne interferometry," Opt. Eng., 23, 350 (1984).

Han, G.S., Kim, S.W., "Numerical correction of reference phases in phase-shifting interferometry by iterative least-squares fitting," Appl. Opt. 33, 7321-7325 (1994).

Huntley, J.M., "Suppression of phase errors from vibration in phase-shifting interferometry," JOSA 15(8) 2233-2241 (1998).

Schmit, J., et al., "White light interferometry with reference signal," *Proceedings of SPIE*, vol. 4777, pp. 102-109 (2002).

Takeda, M., Ina, H., and Kobayashi, S., "Fourier-transform method of fringe pattern anslysis for computer based topography and interferometry," J. Opt. Soc. Am. 72, pp. 156-160 (1982).

International Search Report dated May 2, 2008, corresponding to Int'l. Appln. No. PCT/US07/82646, Int'l. Filing date: Oct. 26, 2007.

\* cited by examiner

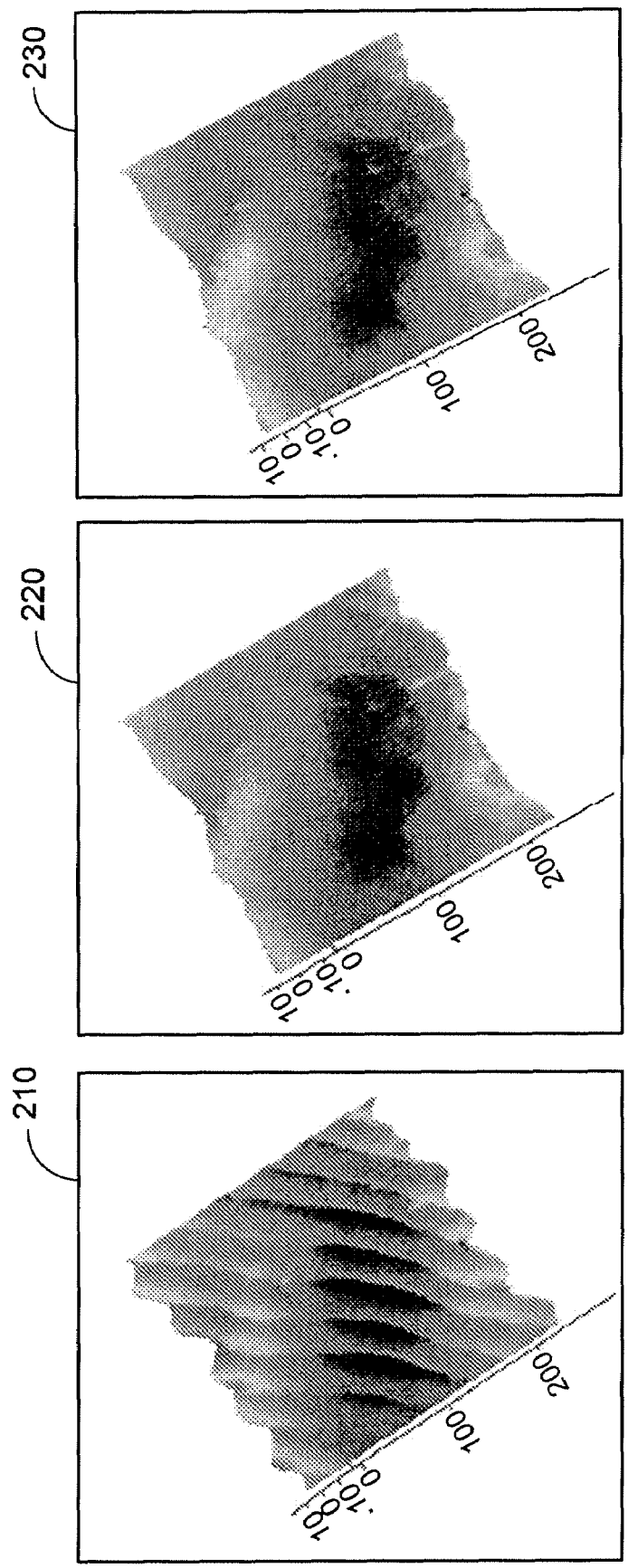

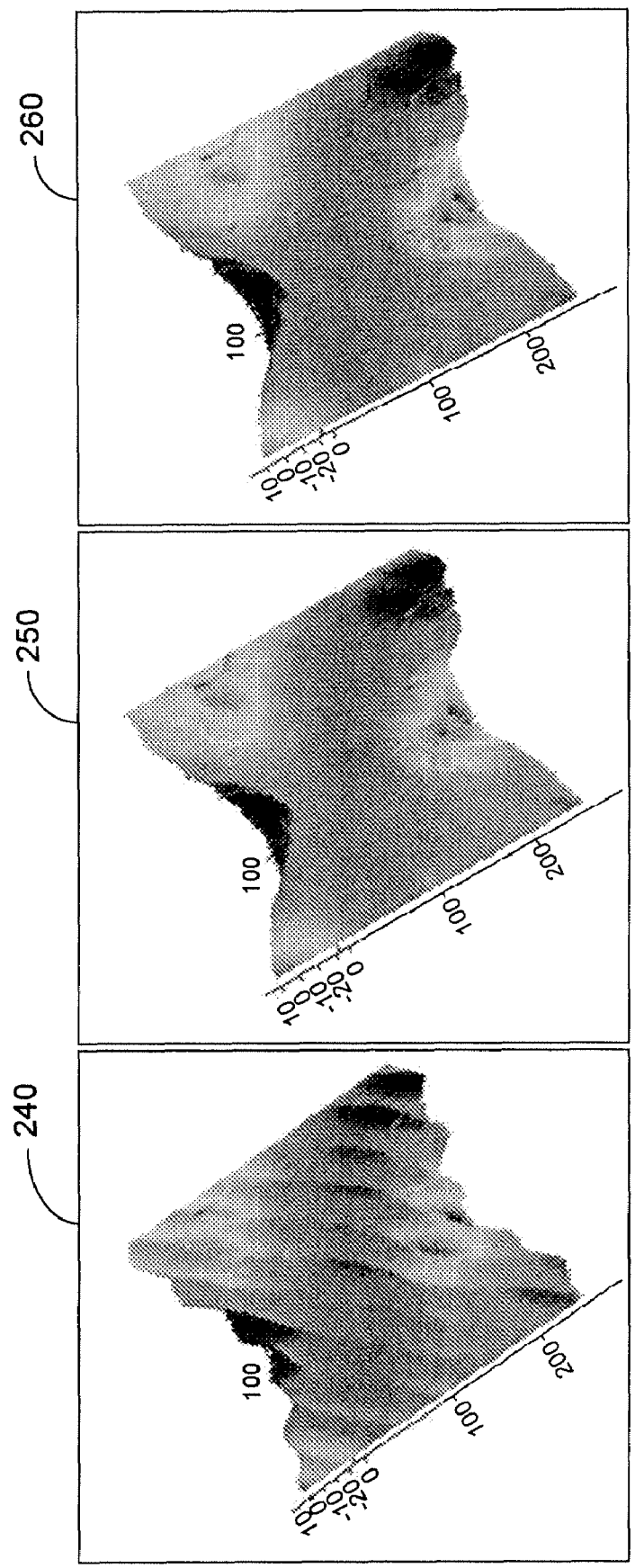

VIBRATION RESISTANT INTERFEROMETRY

CROSS-REFERENCE TO RELATED APPLICATIONS

This application claims priority to Provisional Patent Application No. 60/854,917, entitled "VIBRATION RESISTANT INTERFEROMETRY," filed on Oct. 27, 2006, the entire contents of which are hereby incorporated by reference.

FIELD OF THE INVENTION

The invention relates to phase shifting interferometry methods as well as to related systems.

BACKGROUND

Phase-shifting interferometry (PSI) techniques can be used to measure surface profiles with nanometer level resolutions. A test surface of arbitrary shape is imaged with a Fizeau interferometer capable of producing a controlled phase shift along a Z axis for a PSI acquisition with the chosen algorithm. The optical system is aligned along the Z axis and the surface is imaged onto a camera so each pixel corresponds to a unique position in the XY plane. A laser beam is directed towards a reference surface and the test surface, and the interference between the light beams reflected from the test and reference surfaces are sampled as a function of phase shift and subsequently analyzed with a PSI algorithm to extract the test surface phase map, which is converted into physical units using the known wavelength of the laser beam. A conventional PSI algorithm assumes a constant scanning motion (i.e., constant velocity).

If the scanning motion is not uniform, errors in the measured surface profile occur. Unfortunately, it is often the case that the scanning motion in PSI is not uniform. This can occur due to nonlinear motions of the scanning mechanism, or through vibrations that act on each component of the interferometer differently.

SUMMARY

Methods and systems are disclosed that provide a way to reduce the sensitivity of surface profile measurements using PSI to vibration and/or nonlinear scans. They include a generalized PSI processing technique that can handle large deviations in the expected PSI scan motion.

In general, in one aspect, the invention features a method including choosing a particular PSI algorithm which uses a finite number N of phase shifted intensity values, and acquiring N interferograms at different times corresponding to the phase shifts used by the chosen algorithm, each interferogram represented by intensity measurements at a variety of spatial locations. The method includes calculating a first surface phase profile using the chosen PSI algorithm, calculating information from carrier patterns for at least one of the interferograms to obtain information related to the true phase shifts, and using at least the calculated phase shift information to correct the surface phase profile for errors related to imperfect phase shifts.

In general, in one aspect, the invention features a method including providing scanning interferometry data for a test object using phase shifting interferometry, the data including intensity values for each of multiple scan positions for each of different spatial locations of the test object, the intensity values for each spatial location defining an interference signal for the spatial location, the intensity values for a common scan position defining a data set for that scan position. The method includes temporally transforming at least some of the interference signals into a first frequency domain signal, and determining an estimate of a phase profile of the test object based on the first frequency domain signal. The method includes determining phase shifts at the multiple scan positions based on the estimated phase profile, and determining a more accurate phase profile of the test object based on the estimated phase profile and the phase shifts experienced at the multiple scan positions.

Implementations of the method may include one or more of the following features. Distances between the scan positions are non-uniform. The scanning interferometry data were acquired using a narrow band light source having a center frequency, and the light source has a spectral width less than 1% of the center frequency. The method includes determining a carrier pattern based on a data set for a particular scan position, the carrier pattern representing a relation between the intensity of data points in the data set and the estimated phase associated with the data points. For example, in some embodiments, the carrier pattern represents a relation between the intensity of data points in the data set and the absolute estimated phase or the estimated phase modulo $2\pi$ associated with the data points. The method includes transforming the carrier pattern into a second frequency domain signal with respect to the estimated phase. Determining phase shifts at the multiple scan positions comprises determining phase shifts experienced at the multiple scan positions based on spectral coefficients of the second frequency domain signal. The scanning interferometry data are obtained by a method comprising using an optic to receive light reflected from the test object and a reference object.

In general, in another aspect, the invention features a method including providing scanning interferometry data for a test object using phase shifting interferometry, the data including intensity values for each of multiple scan positions for each of different spatial locations of the test object, the intensity values for each spatial location defining an interference signal for the spatial location, the intensity values for a common scan position defining a data set for that scan position. The method includes transforming at least some of the interference signals into a first frequency domain signal, determining an estimate of a phase profile of the test object based on the first frequency domain signal, determining a carrier pattern based on a data set for a particular scan position, the carrier pattern representing a relation between the intensity of data points in the data set and the phase associated with the data points, and determining a correction to the estimate of the phase profile from the carrier pattern.

Implementations of the method may include one or more of the following features. The method includes determining phase shifts at the multiple scan positions based on spectral coefficients of the carrier pattern. The method includes determining the spectral coefficients of the carrier pattern by transforming the carrier pattern into a second frequency domain signal with respect to the estimated phase. The method includes determining a more accurate phase profile of the test object based on the estimated phase profile and the phase shifts at the multiple scan positions. Distances between the scan positions are non-uniform. The scanning interferometry data were acquired using a narrow band light source having a center frequency and the light source has a spectral width less than 1% of the center frequency. The transformation is a one-dimensional transformation. Determining an estimate of a phase profile comprises determining a phase of a fundamental frequency of an oscillation of the interference signal.

In general, in another aspect, the invention features a method including choosing a phase shifting interferometry (PSI) algorithm that uses a finite number N of phase shifted intensity values, and acquiring N interferograms at different times corresponding to the phase shifts used by the chosen PSI algorithm, each interferogram represented by intensity measurements at a variety of spatial locations. The method includes determining a first surface phase profile using the chosen PSI algorithm, determining phase shift information based on at least one carrier pattern for at least one of the interferograms, and correcting the surface phase profile for errors related to imperfect phase shifts based on the phase shift information.

Implementations of the method may include one or more of the following features. The carrier pattern represents a relation between the intensity of data points in one of the interferograms and the phase associated with the data points In general, in another aspect, the invention features a system including an interferometer configured to provide scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position. The system includes a processor configured to transform at least some of the interference signals into a frequency domain signal, determine an estimate of a phase profile of the test object based on the frequency domain signal, determine phase shifts experienced at the multiple scan positions, and determine a more accurate phase profile of the test object based on the estimated phase profile and the phase shifts experienced at the multiple scan positions.

Implementations of the system may include one or more of the following features. The system includes a narrow band light source having a spectral width less than 1% of a center frequency, the light source being used in providing the scanning interferometry data. The processor is configured to determine a carrier pattern based on a data set for a particular scan position, the carrier pattern representing a relation between the intensity of data points in the data set and the estimated phase associated with the data points. The processor is further configured to transform the carrier pattern into a second frequency domain signal with respect to the estimated phase. The processor determines phase shifts at the multiple scan positions based on spectral coefficients of the second frequency domain signal.

In general, in another aspect, the invention features a system including an interferometer configured to provide scanning interferometry data for a test object using phase shifting interferometry, the data including intensity values for each of multiple scan positions for each of different spatial locations of the test object, the intensity values for each spatial location defining an interference signal for the spatial location, the intensity values for a common scan position defining a data set for that scan position. The system includes a processor configured to transform at least some of the interference signals into a first frequency domain signal, determine an estimate of a phase profile of the test object based on the frequency domain signal, and determine a carrier pattern based on a data set for a particular scan position, the carrier pattern representing a relation between the intensity of data points in the data set and the phase associated with the data points.

Implementations of the system may include one or more of the following features. The system includes a narrow band light source having a spectral width less than 1% of a center frequency, the light source being used in providing the scanning interferometry data. The processor is configured to transform the carrier pattern into a second frequency domain signal with respect to the estimated phase. The processor is configured to determine phase shifts at the multiple scan positions based on spectral coefficients of the second frequency domain signal. The processor is configured to determine a more accurate phase profile of the test object based on the estimated phase profile and the phase shifts at the multiple scan positions.

The systems may further include features corresponding to the methods described above.

Unless otherwise defined, all technical and scientific terms used herein have the same meaning as commonly understood by one of ordinary skill in the art to which this invention belongs.

Other features, objects, and advantages of the invention will be apparent from the following detailed description.

BRIEF DESCRIPTION OF THE DRAWINGS

FIG. 13A to 13C and 14A to 14C are graphs showing surface profiles.

DETAILED DESCRIPTION

Figure 1:
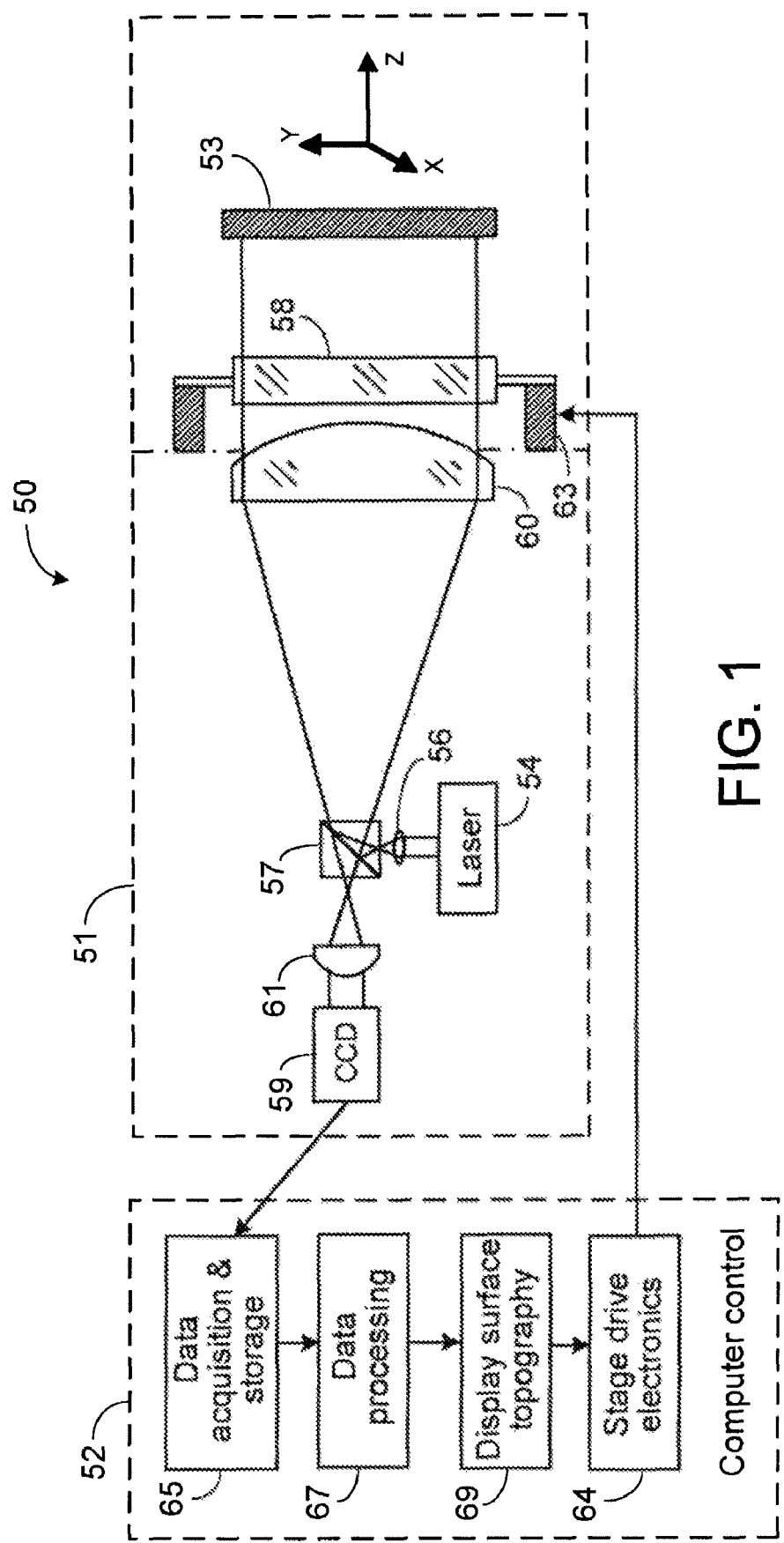
FIG. 1 is a diagram of a scanning interferometry system.

Scanning interferometry data are generally obtained by detecting the intensity of interference between light (e.g., ultraviolet light, visible light, or infrared light) reflected from a test object and light reflected from a reference object. The intensity of the interference depends on an optical path difference (OPD) between the light reflected from the test object and light reflected from the reference object. For each spatial location of the test object (e.g., for each of different locations about a surface of the test object), the OPD depends upon properties of the spatial location (e.g., the height of the spatial location).

Typically, scanning interferometry data are obtained by using a scan mechanism to vary the OPD between the light reflected from the test object and the light reflected from the reference object. The scanning mechanism generally moves at least one of the test and reference objects through multiple scan positions along a scan dimension (e.g., continuously or in discrete steps). Each scan position corresponds to a different OPD between the test and reference objects. For each scan position, a detector detects the intensity of interference for each of multiple spatial locations of the test object. The intensities can be used to determine information about the test object. Other types of scanning mechanism to vary the OPD can be considered, for example varying the wavelength instead of the physical cavity length could be employed, as described in U.S. Pat. No. 6,882,432.

Information about a test object that can be determined from scanning interferometry data includes, for example, information related to a spatial property (e.g., a height such as relative height) of one or more spatial locations of the test object. Examples of information related to a spatial property (e.g., height) of a test object include an OPD (e.g., an OPD corresponding to a spatial location of the test object) and a phase of interference (e.g., a phase of interference between light reflected from a spatial location of the test object and light reflected from the reference object).

Determining information about the test object typically includes the use of initial scan values for the scan positions. Use of the initial scan values assumes ideal scan mechanism motion (e.g., uniform and precise motion) along the scan dimension. Hence, scan value increments between the initial scan values are uniform along the scan dimension. In practice, scan mechanism motion tends to have some degree of non-ideality (e.g., non-uniformity and/or imprecision). One source of non-ideal scan mechanism motion includes vibrations (e.g., from air currents and/or nearby machinery), which can cause one or both of the test and reference objects to move (e.g., vibrate) with respect to the other. Another source of non-ideal scan mechanism motion includes non-uniform (e.g., non-linear) motion of the scan mechanism along the scan dimension. The use of initial scan values that incorporate the assumption of ideal scan mechanism motion can introduce artifacts (e.g., errors) into the information about the test object.

As described herein, scan values can be provided for each of at least some (e.g., all) of the scan positions of scanning interferometry data for a test object. In general, the scan values can accommodate for non-ideal motion of the scan mechanism. At least some (e.g., most or all) of the scan value increments between different scan values may be different (e.g., the scan value increments may be non-uniform).

Information about the test object can be determined based on the scanning interferometry data and the scan values. Typically, the information about the test object determined based on the scan values contains fewer artifacts (e.g., fewer and smaller magnitude errors) with respect to the test object than information determined based on initial scan values that incorporate the assumption of ideal scan mechanism motion.

Scan values provided for the scan positions can be expressed in many different units (e.g., units of phase, distance, and/or OPD). The scan values can be absolute (e.g., the scan values can relate to an absolute (e.g., total) OPD between test and reference objects) or relative (e.g., the scan values can be scan value increments related to an incremental OPD change between the test and reference objects for different (e.g., successive) scan positions). Scan values can be expressed as scan value increments related to increments between absolute scan values.

In some embodiments, the information about the test object is determined based on interference signals corresponding to each of at least some of different test object spatial locations. The determination can include transforming (e.g., by Fourier methods) the interference signals into a frequency domain with respect to the scan values. Such methods can generalize transform methods to account for non-ideal scan mechanism motion.

In some embodiments, scan values (e.g., relative scan values, such as scan value increments) for the scan positions (e.g., for the scan position increment between one or more scan positions) are determined using the scanning interferometry data themselves. For example, determining a scan value for a scan position can include determining information related to multiple spatial locations of a test object based on scanning interferometry data and determining a scan value for the scan position based on a relationship between the intensities of the scan position and the information related to the spatial locations to which the intensities of the scan position correspond. Typically, the information related to the spatial locations is related to the heights of the spatial locations.

System Overview

Referring now to FIG. 1, an exemplary interferometer system 50 for obtaining interference signals includes an interferometer 51 and a processor 52 (e.g., an automated computer control system). The measurement system 50 is operable to obtain scanning interferometry data of spatial locations of a surface of a test object 53.

Measurement system 50 includes a light source 54, a first focusing optic (e.g., one or more lenses) 56, a beam splitting element 57, a second focusing optic 60, a reference object 58, a third focusing optic 61, and a detector 59. Light source 54 emits spectrally-narrowband light with high coherence (e.g., laser). First focusing optic 56 focuses light from the light source 54 onto beam-splitting element 57, which redirects the light towards second focusing optic 60, which collimates the light and transmits collimated light to reference object 58.

The reference object 58 can be, e.g., a piece of glass that partially reflects the collimated light and partially transmits the collimated light. The light that passes through the reference object 58 is transmitted towards the test object 53. Light reflected from the test object 53 and light reflected from the reference object 58 is received by second focusing optic 60, which transmits the combined reflected light back to beam-splitting element 57. Beam-splitting element 57 transmits the combined light to third focusing optic 61, which focuses the combined light to a detector 59.

Detector 59 is typically a multidimensional detector (e.g., a charge coupled device (CCD) or charge injection device (CID)) having a plurality of detector elements (e.g., pixels) arranged in one or more dimensions (e.g., two dimensions). Optics 60 and 61 focus light reflected from test object 53 onto detector 59 so that each detector element of detector 59 receives light reflected from a corresponding spatial location (e.g., a point or other small region) of test object 53. Light reflected from respective spatial locations of test object 53 and light reflected from reference object 58 interferes at detector 59. Each detector element produces a detector signal related to the intensity of the interfering light.

System 50 is configured to measure interference signals related to spatial locations of test object 53. Typically, system 50 creates an OPD between light reflected from reference object 58 and light reflected from test object 53. For example, reference object 58 can be displaced through a number of scan positions along a scan dimension axis (Z axis in the example of FIG. 1) by a scan mechanism (e.g., an electro-mechanical transducer 63 (e.g., a piezoelectric transducer (PZT)), and associated drive electronics 64) controlled by computer 52. In some embodiments, a scan position increment between successive scan positions is at least about $\lambda/15$ (e.g., at least about $\lambda/8$, at least about $\lambda/4$) (or some other values), where $\lambda$ is a mean wavelength of the light detected at each pixel.

For each scan position, detector 59 outputs an intensity value (e.g., the intensity detected by a given detector element) for each of multiple different spatial locations of the test object. Taken along the scan dimension, the intensity values for each spatial location define an interference signal corresponding to the spatial location. The intensity values corresponding to a common scan position define a data set (e.g., an interferogram) for that scan position. The data sets for all the scan positions are analyzed with a PSI algorithm to extract the test surface phase map, which is converted into physical units using the known wavelength of the light source 54.

Direct Compensation of Phase Errors Using Carrier Patterns

The following describes a direct method for compensating phase errors using carrier patterns, hereinafter referred to as the "direct method." In the absence of vibrations, the measured phase map is undistorted. If the intensity is plotted against the measured phase height at one instant in time, a perfect sinusoid would be produced. This plot is called a carrier pattern. If now vibrations along the Z axis are introduced during the acquisition, then as long as the test object 53 acts as a rigid body, all image points with the same modulo-$2\pi$ phase height suffer the same distortion because they experience identical phase shifts. The carrier pattern then appears as a series of repeating, identically distorted sinusoids. This distortion is related to the error in the measured surface of the test object 53 and can be used to correct the measured surface for vibrational induced errors. It is useful to consider the carrier pattern as a 1-dimensional representation of the 2-dimensional interferogram of the measured surface. The carrier pattern is thus a surface shape independent spatial intensity representation with characteristics that provide a natural way to determine the phase error as a function of surface height.

As discussed above, the presence of the vibrations and other non-ideal scan mechanism motion can introduce errors when information about the object is determined from interference signals based on initial scan values (which neglect non-ideal scan mechanism movement). The errors introduced by the vibrational disturbance contaminate not only the interference signals along the scan dimension axis but the intensity values detected for a common scan position. Errors introduced by non-uniform scan mechanism motion also perturb both the interference signals and the intensity data for each scan position.

Intensity values are typically obtained for each of at least about 3 scan positions, but typically more, for example 7 or 13 or more scan positions.

In general, detector 59 includes at least about 4,000 (e.g., at least about 256,000, at lest about 1,024,000) detector elements. The scanning interferometry data typically include a number of interference signals equal to the number of detector elements and corresponding to the same number of test object spatial locations. System 50 can process the scanning interferometry data (e.g., using methods described herein) to determine, for example, information about the test object.

In some examples, reference object 58 is optically flat. In some examples, reference object 58 exhibits a three-dimensional surface topography.

In some examples, the motion of the scan mechanism is continuous along the scan dimension (Z axis in the example of FIG. 1). The interference intensity variation during a PSI acquisition in the presence of a pure vibrational tone can be written as:

$$I(\vec{x},t)=I_0\{1+V\cos[\Phi(\vec{x})+2\pi v_0 t+r\cos(2\pi v_v t+\alpha)]\} \quad \text{(Equ. 1)}$$

where $I_0$ is the average interference intensity, V the contrast of the interference intensity variation (e.g., the fringe contrast), $v_0$ is the fundamental interference frequency of the PSI acquisition, $v_v$ is the vibration frequency (or frequency of the intensity disturbance), $\alpha$ is the starting phase of the intensity disturbance, $r$ is the vibration (disturbance) amplitude, and $\Phi(\vec{x})$ is the interferometric starting phase (the phase to be recovered) which will depend on the surface position.

For convenience, Equ. 1 is separated into a DC term and the signal of interest $s(\vec{x},t)$ $$s(\vec{x},t) = \frac{I_0 V}{2}\left[e^{i\Phi(\vec{x})}e^{i\beta(t)} + e^{-i\Phi(\vec{x})}e^{-i\beta(t)}\right] \quad \text{(Equ. 2)}$$

with $\beta(t)=2\pi v_0 t+r\cos(2\pi v_v t+\alpha)$ representing the actual phase shift variation experienced during the acquisition. The exponentials are written with the help of the Jacobi-Anger expansion $$\left(\exp[iu\cos(\alpha)] = J_0(u) + 2\sum_{k=1}^{\infty}i^k J_k(u)\cos(k\alpha)\right)$$

as $$s(\vec{x},t)=s0(\vec{x},t)+s1^+(\vec{x},t)+s1^-(\vec{x},t)+s2^+(\vec{x},t)+s2^-(\vec{x},t) \quad \text{(Equ. 3)}$$

where the superscript denotes the sign of the vibrational phase. The individual terms are given by:

$$s0(\vec{x},t) = I_0 V J_0(r)\cos(\Phi(\vec{x}) + 2\pi v_0 t) \quad \text{(Equ. 4)}$$

$$s1^\pm(\vec{x},t) = \frac{I_0 V}{2}\sum_{k=1}^{\infty} i^k J_k(r)\exp(i\Phi(\vec{x})\pm ik\alpha)\exp(i2\pi t(v_0 \pm kv_v))$$

$$s2^\pm(\vec{x},t) = \frac{I_0 V}{2}\sum_{k=1}^{\infty}(-i)^k J_k(r)\exp(-i\Phi(\vec{x})\pm ik\alpha)$$

$$\exp(i2\pi t(-v_0 \pm kv_v))$$

The equations above assume the intensity samples are instantaneous. The detector 59 samples the intensity over some finite time interval, during which the intensity is integrated by accumulating photocurrent. Including this effect is straightforward by integrating the intensity equations (Equ. 4) over the detector integration period $\tau$. Noting that $$\frac{1}{\tau}\int_{t-\frac{\tau}{2}}^{t+\frac{\tau}{2}} e^{igt'} dt' = e^{igt}\text{sinc}(g\tau/2), \quad \text{(Equ. 5)}$$

The individual terms become $$s0(\vec{x}, t) = I_0 V J_0(r)\text{sinc}(\pi v_0 \tau)\cos(\Phi(\vec{x}) + 2\pi v_0 t) \quad \text{(Equ. 6)}$$

$$s1^{\pm}(\vec{x}, t) = \frac{I_0 V}{2}\sum_{k=1}^{\infty} i^k J_k(r)\text{sinc}(\pi\tau(v_0 \pm k v_v))$$

$$\exp(i\Phi(\vec{x}) \pm ik\alpha)\exp(i2\pi t(v_0 \pm k v_v))$$

$$s2^{\pm}(\vec{x}, t) = \frac{I_0 V}{2}\sum_{k=1}^{\infty} (-i)^k J_k(r)\text{sinc}(\pi\tau(-v_0 \pm k v_v))$$

$$\exp(-i\Phi(\vec{x}) \pm ik\alpha)\exp(i2\pi t(-v_0 \pm k v_v))$$

The spectrum is calculated with the Fourier transform:

$$S(v) = \int_{-\infty}^{\infty} s(t)\exp(-i2\pi v t) dt \quad \text{(Equ. 7)}$$

producing $$S(v) = S0(v) + S1^+(v) + S1^-(v) + S2^+(v,v_v) + S2^-(v,v_v) \quad \text{(Equ. 8)}$$

with $$S0(x, v) = \frac{I_0 V}{2} J_0(r)\text{sinc}(\pi v_0 \tau)\begin{bmatrix} e^{i\Phi(\vec{x})}\delta(v - v_0) + \\ e^{-i\Phi(\vec{x})}\delta(v + v_0) \end{bmatrix} \quad \text{(Equ. 9)}$$

$$S1^{\pm}(x, v, v_v) =$$

$$\frac{I_0 V}{2}\sum_{k=1}^{\infty} i^k J_k(r)\text{sinc}(\pi\tau(v_0 \pm k v_v))e^{i(\Phi(\vec{x})\pm k\alpha)}\delta(v - v_0 \mp k v_v)$$

$$S2^{\pm}(x, v, v_v) = \frac{I_0 V}{2}$$

$$\sum_{k=1}^{\infty} (-i)^k J_k(r)\text{sinc}(\pi\tau(-v_0 \pm k v_v))e^{i(-\Phi(\vec{x})\pm k\alpha)}\delta(v + v_0 \mp k v_v)$$

where $\delta(v)$ is the Dirac delta function. Time and frequency domain representations of the signal are distinguished by lower and upper case variables respectively. The standard PSI procedure is to measure $\Phi(\vec{x})$ by evaluating the phase at the fundamental interference frequency $v_0$:

$$\hat{\Phi}(\vec{x}) = \tan^{-1}\left\{\frac{\text{Im}[S(\vec{x}, v_0)]}{\text{Re}[S(\vec{x}, v_0)]}\right\}. \quad \text{(Equ. 10)}$$

In this description, the caret indicates measured quantities. The terms in Equ. 9 contribute to $\hat{\Phi}(\vec{x})$ only if the argument of the delta-function equals zero. For the vibrationally induced spectral terms, this occurs only when the vibrational frequency satisfies $v_v = 2v_0/k$. Combining the nonzero terms, the spectral component at $v_0$ becomes, $$S(\vec{x}, v_0) = \quad \text{(Equ. 11)}$$

$$\frac{I_0 V}{2}\left[J_0(r)\text{sinc}(\pi v_0 \tau)e^{i\Phi(\vec{x})} + \sum_{k=1}^{\infty} (-i)^k J_k(r)\text{sinc}(\pi\tau(k v_v - v_0))\right.$$

$$\left. e^{i(k\alpha - \Phi(\vec{x}))}\delta(v_v - 2v_0/k)\right].$$

Note that for small r, $J_0(r)\approx 1$ and $J_1(r)\approx r/2$.

Equ. 11 was verified by performing a simulation using a long (256 sample) PSI algorithm and the root-mean-square (RMS) phase error was determined as a function of the vibrational frequency. To reduce aliasing effects, the interference fundamental was set to 10% of the sample rate.

Figure 2:
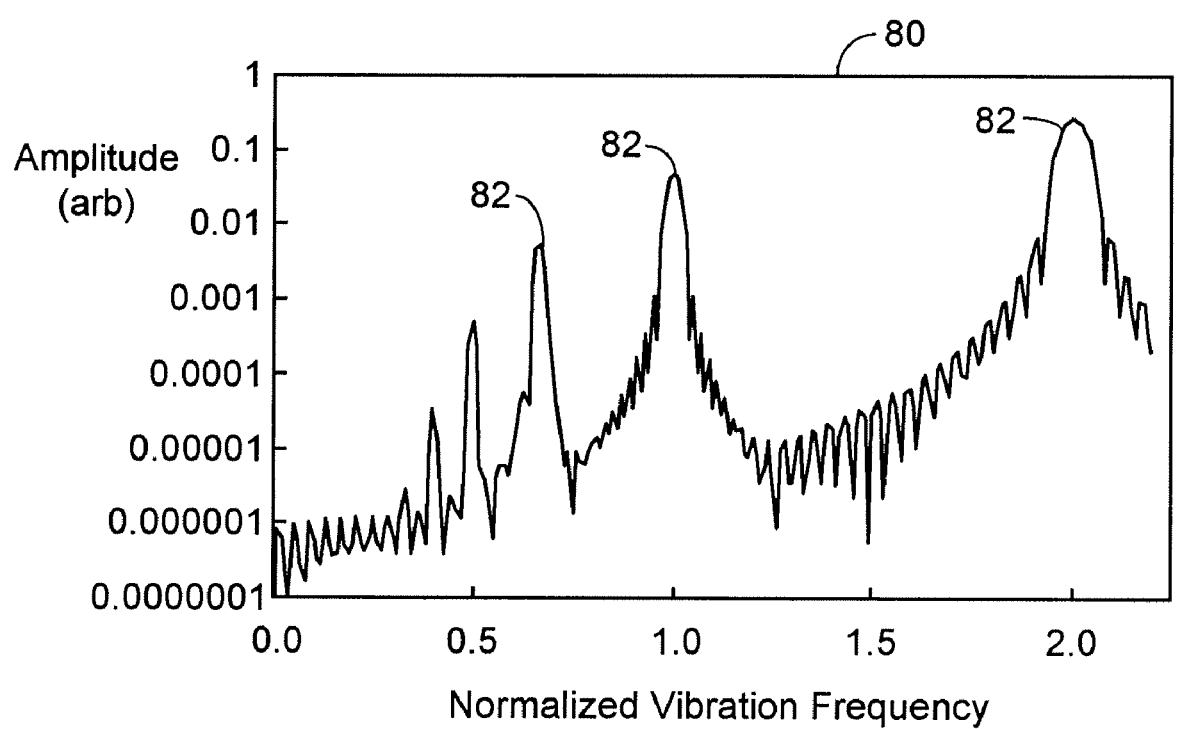
FIG. 2 is a graph showing root mean square phase error magnitude as a function of normalized vibration frequency.

FIG. 2 is a graph 80 that shows the amplitude of the RMS phase error. In FIG. 2, the RMS error peaks 82 occur at vibrational frequencies that satisfy $v_v = 2v_0/k$, and the relative amplitude of the peaks 82 decreases as the value of k increases, as predicted by Equ. 11.

The sum in Equ. 11 represents the error in the phase computed by an infinitely sampled PSI algorithm in the presence of vibrations. For a single pure vibrational tone, the sum has only one nonzero term, and only if the vibrational frequency satisfies $v_v = 2v_0/k$. However, practical PSI algorithms only sparsely time-sample the interference, replacing the delta-functions with the Fourier transform of the sampling function. This reduces spectral resolution and increasing leakage, so the power from a single vibrational tone will leak across the measured spectrum. In practice therefore, many terms contribute to the sum in Equ. 11, even if only a single vibrational tone is present, with the influence of the higher order terms increasing with vibration strength.

Information from the analysis of carrier patterns is used to evaluate the contribution from the 1st order term in Equ. 11. The carrier patterns are defined as the intensity at a particular instant in time as a function of measured phase height. An analytic description for the carrier pattern is obtained by inverting Equ. 11 for an expression of the true phase as a function of measured phase and inserting the result into Equ. 2. Writing Equ. 11 as, $$y = \frac{\eta x + \mu/x}{|\eta x + \mu/x|} \quad \text{(Equ. 12)}$$

where $\eta = J_0(r_0)\text{sin c}(\pi\tau v_0)$, $$\mu = \sum_{k=1}^{\infty} (-i)^k J_k(r)$$

$\text{sin c}(\pi\tau(k v_v - v_0))e^{ik\alpha}\delta(v_v - 2v_0/k)$, $y = e^{i\hat{\Phi}}$ and $x = e^{i\Phi}$ produces a quadratic in $x^2$ with solutions, $$x = \pm y\sqrt{\frac{1-z}{1-\bar{z}}}, \quad \text{(Equ. 13)}$$

where $z = \mu/\eta y^2$ and the bar over variables represents the complex conjugate. The positive solution is taken since the measured phase must tend toward the true phase as the vibration amplitude tends to zero. The radical is unfortunate, making it difficult to extract a simple analytic expression for the carrier pattern. However, for vibrations with small enough amplitude, $$|z| \propto \left|\frac{\mu}{\eta}\right| < 1,$$

and the radical can be expanded in a Taylor series to obtain, $$e^{i\Phi(\vec{x})} = e^{i\hat{\Phi}(\vec{x})} \sum_{m=0}^{\infty} g_m e^{-i2m\hat{\Phi}(\vec{x})} \sum_{n=0}^{\infty} h_n e^{i2n\hat{\Phi}(\vec{x})} \quad \text{(Equ. 14)}$$

with coefficients $$g_m = \frac{\frac{1}{2}!}{\left(\frac{1}{2}-m\right)! m!} \left(-\frac{\mu}{\eta}\right)^m \text{ and } h_n = \frac{\left(n-\frac{1}{2}\right)!}{\left(-\frac{1}{2}\right)! n!} \left(\frac{\mu}{\eta}\right)^n.$$

The product of the two sums produces a series of positive and negative odd harmonics of the measured phase $$e^{i\Phi(\vec{x})} = \sum_{k=-\infty}^{\infty} g_k e^{i(2k+1)\hat{\Phi}(\vec{x})}, \quad \text{(Equ. 15)}$$

with the harmonic coefficients $g_k$ given by $$g_k = \sum_{m=0}^{\infty} \sum_{n=0}^{\infty} g_m h_n \text{ for } n = m+k. \quad \text{(Equ. 16)}$$

Expanding Equ. 13 is not as significant a limitation as it might first appear to be, mainly because the PSI measured phase will be used later in the correction, so the vibration amplitude must be small enough to allow a PSI measurement in the first place. Note Equ. 15 implies the true phase is a function of only odd harmonics of the PSI measured phase.

Evaluating the harmonic coefficients directly is impractical since they depend on μ, which itself depends on the vibrational spectrum. However the coefficients can be measured using the carrier patterns. Inserting Equ. 15 into Equ. 2, the carrier pattern $c(\hat{\Phi},t)$ can be written as $$c(\hat{\Phi}, t) = \frac{I_0 V}{2} \left\{ \begin{array}{l} e^{i\beta(t)} \left[ \begin{array}{l} \sum_{k=0}^{\infty} g_k e^{i(2k+1)\hat{\Phi}} + \\ \sum_{k=1}^{\infty} g_{-k} e^{-i(2k-1)\hat{\Phi}} \end{array} \right] + \\ e^{-i\beta(t)} \left[ \begin{array}{l} \sum_{k=0}^{\infty} \overline{g}_k e^{-i(2k+1)\hat{\Phi}} + \\ \sum_{k=1}^{\infty} \overline{g}_{-k} e^{i(2k-1)\hat{\Phi}} \end{array} \right] \end{array} \right\}. \quad \text{(Equ. 17)}$$

Performing a Fourier transform with respect to $\hat{\Phi}$ $$C(K, t) = \int_{-\infty}^{\infty} c(\hat{\Phi}, t) \exp(-iK\hat{\Phi}) d\hat{\Phi} \quad \text{(Equ. 18)}$$

produces $$C(K, t) = \frac{I_0 V}{2} \left\{ \begin{array}{l} e^{i\beta(t)} \left[ \begin{array}{l} \sum_{k=0}^{\infty} g_k \delta(K - (2k+1)) + \\ \sum_{k=1}^{\infty} g_{-k} \delta(K + (2k-1)) \end{array} \right] + \\ e^{-i\beta(t)} \left[ \begin{array}{l} \sum_{k=0}^{\infty} \overline{g}_k \delta(K + (2k+1)) + \\ \sum_{k=1}^{\infty} \overline{g}_{-k} \delta(K - (2k-1)) \end{array} \right] \end{array} \right\}. \quad \text{(Equ. 19)}$$

Thus the Fourier transform of the carrier pattern with respect to the measured phase produces a spectrum with peaks at odd multiples of $\hat{\Phi}$ and the complex value at each peak contains a linear sum of two harmonic coefficients, $$C(2k+1, t) = e^{i\beta(t)} g_k + e^{-i\beta(t)} \overline{g}_{-(k+1)} \quad \text{(Equ. 20)}$$

for k=0 . . . ∞. The appearance of both $e^{i\beta(t)}$ and $\overline{g}_{-(k+1)}$ complicates the numerical evaluation of the harmonic coefficients from the carrier pattern spectrum. However, analysis of Equ. 16 provides the following excellent approximation for all vibration amplitudes of interest $$g_k \cong -(2k-1)\overline{g}_{-k}, \quad \text{(Equ. 21)}$$

from which Equ. 15 can be rewritten as, $$e^{i\Phi(\vec{x})} \cong e^{i\hat{\Phi}(\vec{x})} \left( g_0 + \sum_{k=1}^{\infty} \left( g_k e^{i2k\hat{\Phi}(\vec{x})} - \frac{\overline{g}_k e^{-i2k\hat{\Phi}(\vec{x})}}{2k-1} \right) \right) \quad \text{(Equ. 22)}$$

and Equ. 20 as, $$C(2k+1, t) \cong e^{i\beta(t)} g_k - e^{-i\beta(t)} \frac{g_{k+1}}{2k+1}. \quad \text{(Equ. 23)}$$

Noting that that the magnitude of $g_k$ diminishes as k increases, an estimate for $e^{i\beta}$ is found by assuming the second term in Equ. 23 becomes negligible at some appropriately large value κ for k. Successive back-substitutions through the set of Equ. 23 for k=κ . . . 0, along with the fact that Im($g_0$)=0, supplies the following equation for $e^{i\beta(t)}$ $$0 = \text{Im}\left( C(1, t) e^{-i\beta(t)} + \sum_{k=1}^{\kappa} C(2k+1, t) \frac{e^{-i(2k+1)\beta(t)}}{2k-1} \right). \quad \text{(Equ. 24)}$$

Solving Equ. 24 numerically for β(t) is straightforward, after which each of the harmonic coefficients can be extracted using Equ. 23 and the corrected phase $\hat{\Phi}$ obtained with Equ.

22. Each time sample of the PSI acquisition produces an independent measure of the harmonic coefficients, and since they must be time independent, can be averaged together to further reduce measurement errors. It is useful to note that in principle the method can be applied regardless of detector integration since the harmonic coefficients derived from the carrier patterns automatically account for the effect this has on the spectrum. A practical limitation occurs if the vibration is severe enough to significantly degrade fringe contrast during the integration time, but in that case typically the PSI algorithm fails.

Simulation of the Direct Method

The following is an example used to illustrate the mathematical procedure outlined above.

Figure 3:
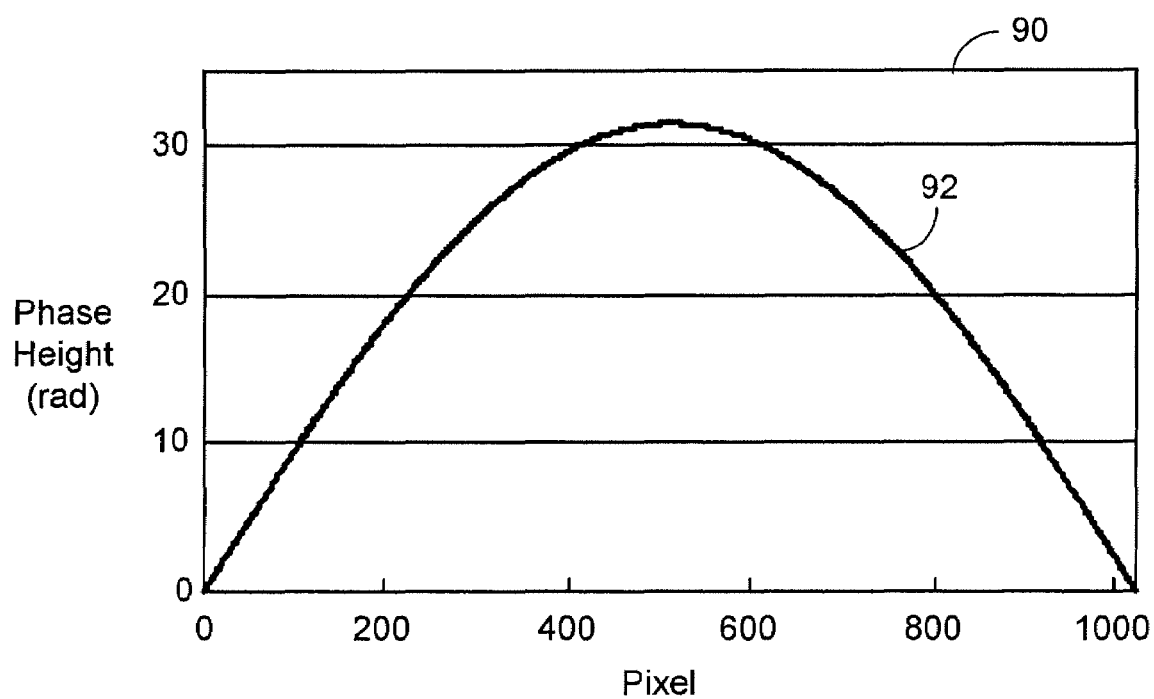
FIG. 3 is a graph that shows the phase height profile of a simulated surface.

FIG. 3 is a graph 90 shows the true phase height profile 92 of a simulated surface. The profile 92 has length L, is spatially sampled at 1024 locations (pixels) and has a shape equal to $\phi(x)=10\pi \sin(\pi x/L)$, i.e., 5 fringes of surface departure.

Interference data are generated for a 7 frame PSI algorithm, described in "Vibration in phase shifting interferometry" by de Groot, Journal of the Optical Society of America A, 12(2), 354-365 (1995).

Figure 4:
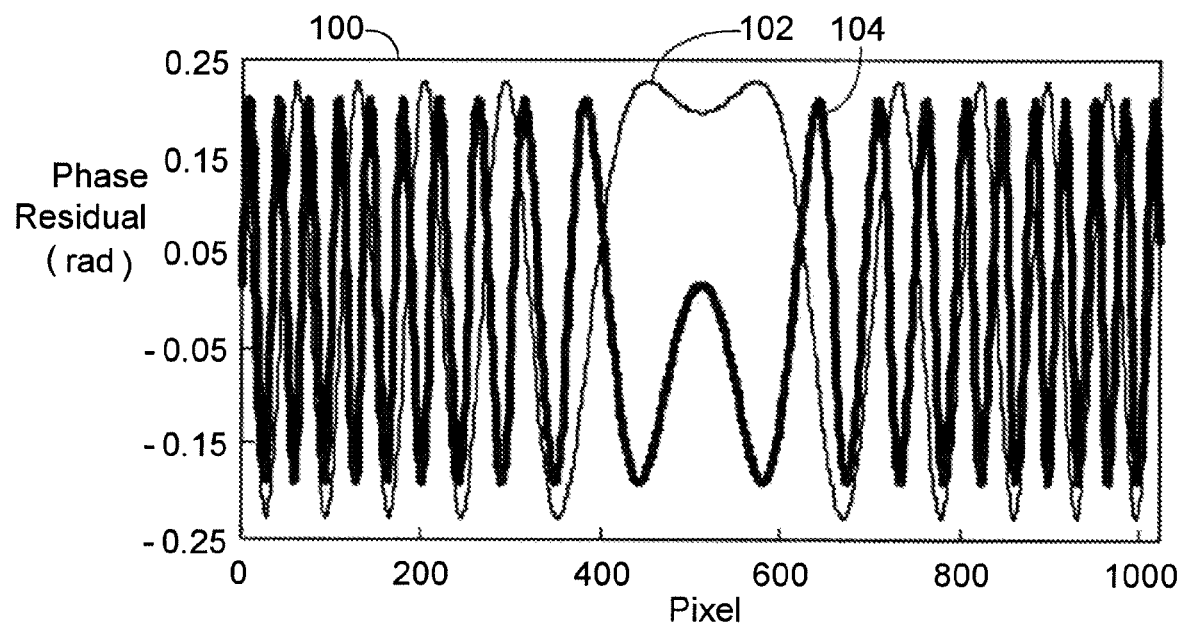
FIG. 4 is a graph that shows the difference between the phase profile measured with this algorithm and the true profile of the simulated surface of FIG. 3 when there is vibration.

FIG. 4 is a graph 100 that shows the difference between the profile measured with this algorithm and the true profile for a vibration frequency of 20% of the sample rate and vibration amplitude of 1 rad. The light curve 102 represents the associated interferogram, and the darker curve 104 represents the distortion (i.e., the difference between the profile measured with this algorithm and the true profile). Comparing curves 102 and 104 shows that the distortion has 2 cycles for each cycle of the interferogram. The vibration amplitude of 1 rad represents unusually large vibration amplitudes in standard practice, but serves to better illustrate the distortions. The residual shows the expected 2-cycle error characteristic of vibrational distortions, with an amplitude of about 0.2 rad. Seven carrier patterns are constructed by plotting the intensity as a function of measured phase for each of the 7 frames in the acquisition.

Figure 5:
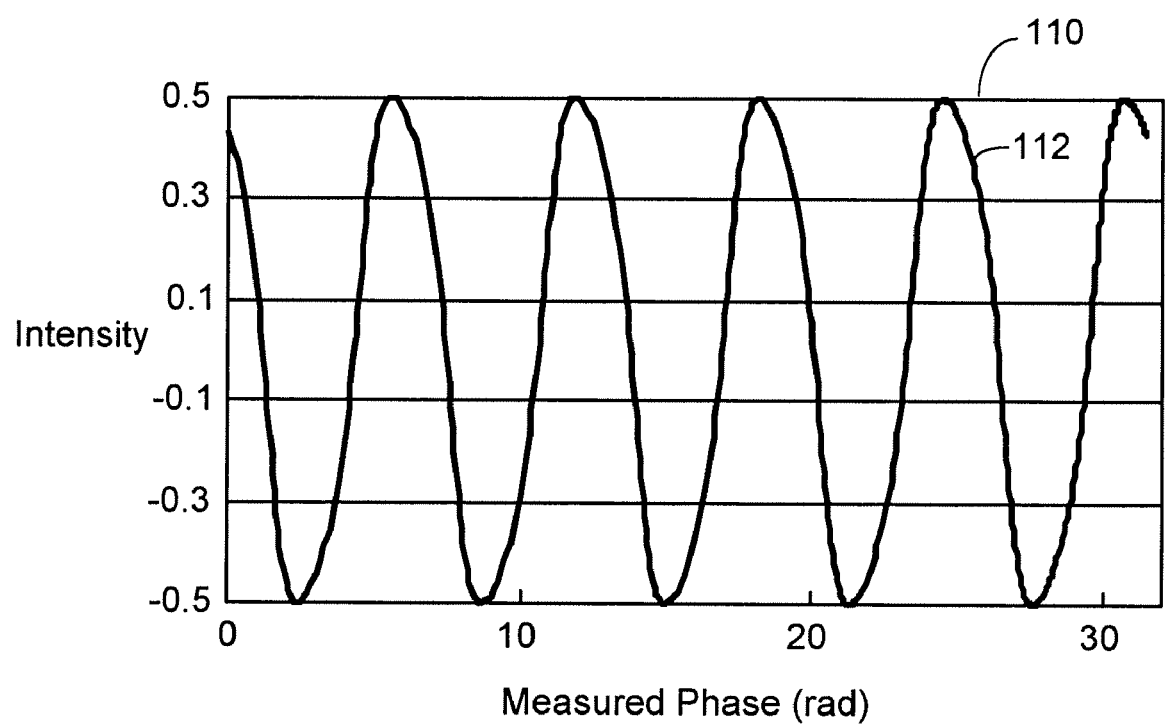
FIG. 5 is a graph that shows a carrier pattern.

FIG. 5 is a graph 110 that shows the carrier pattern 112 obtained from the first frame. Note that the points plotted in FIG. 5 are indexed by measured phase. As predicted, the carrier pattern is a repeating series of identically distorted sinusoids with the number of sinusoids equal to the total fringe departure of the profile.

Figure 6:
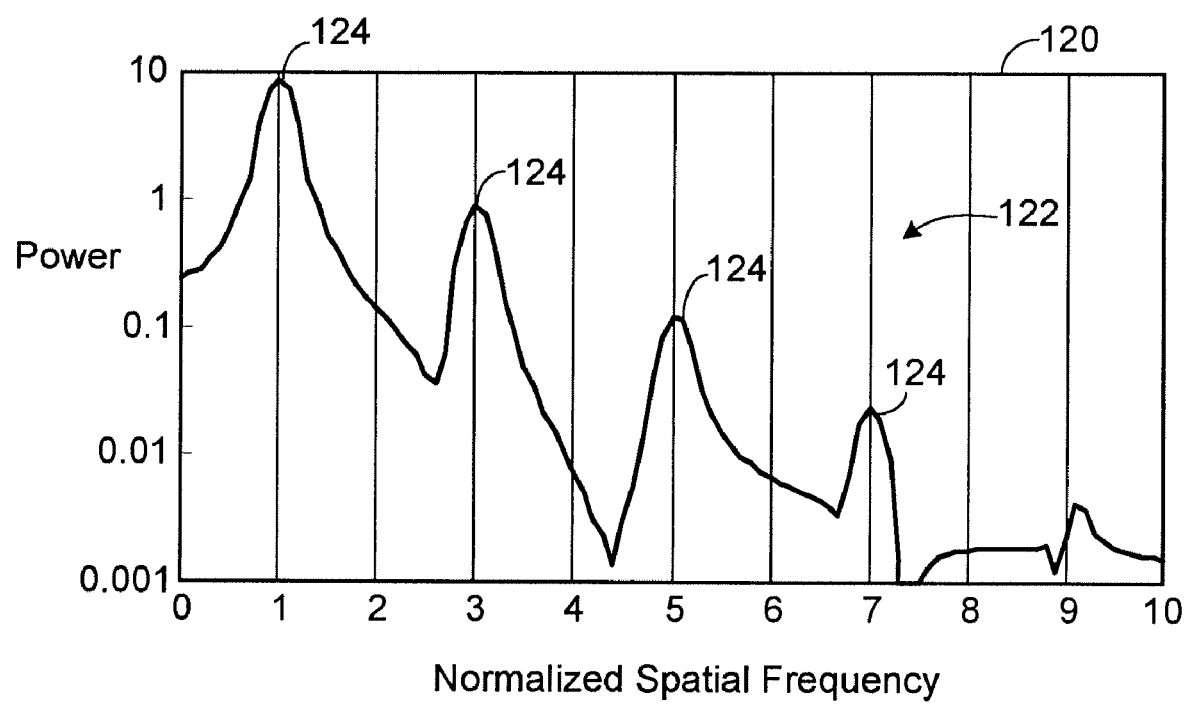
FIG. 6 is a graph that shows a power spectrum of the carrier pattern.

FIG. 6 is a graph 120 that shows a power spectrum 122 of the carrier pattern 112 of FIG. 5. Graph 120 shows that peaks 124 of the power spectrum 122 occur only at odd multiples of the fundamental fringe frequency.

The harmonic coefficients $g_k$ are determined with Equs. 23 and 24 using the complex spectra at the odd harmonics computed with a windowed Fourier transform. The harmonic coefficients and the measured phase map are then used in Equ. 22 to calculate the corrected phase for each pixel. The final step is to spatially unwrap the corrected phase profile using standard techniques.

Figure 7:
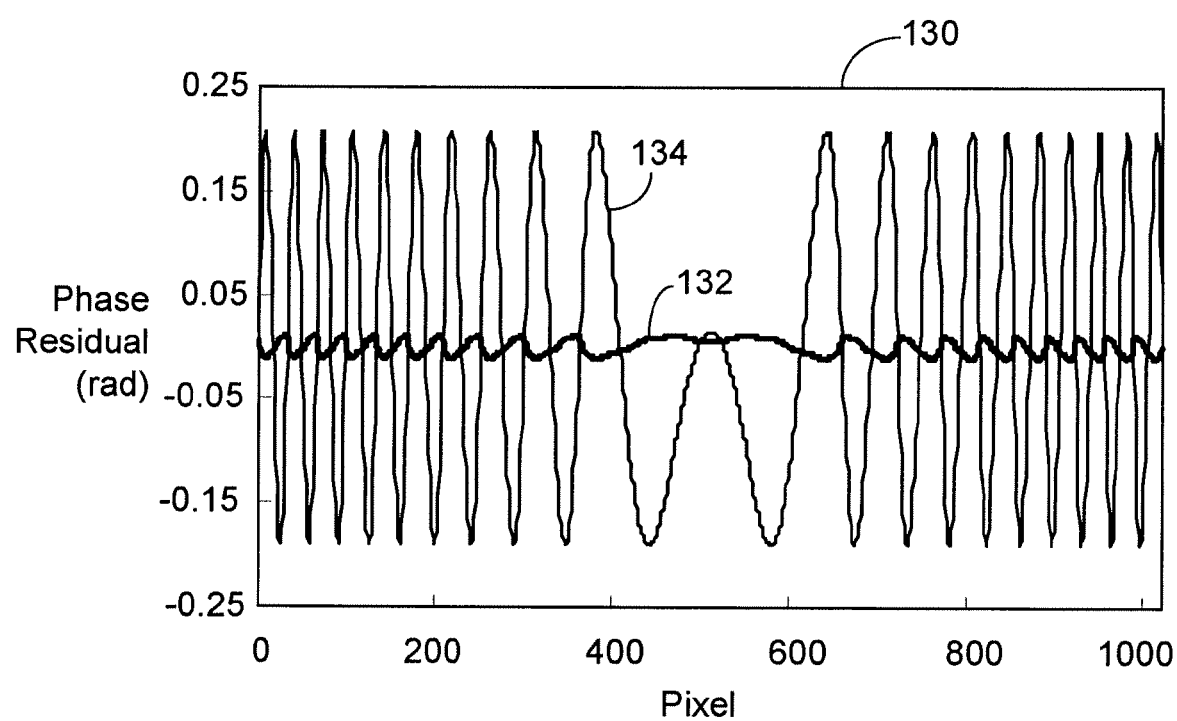
FIG. 7 is a graph showing residual phase errors.

FIG. 7 is a graph 130 showing a darker curve 132 representing the residuals of the corrected phase profile using the first 3 harmonic coefficients, compared to a lighter curve 134 representing the uncorrected residuals. Comparing curve 132 and 134, the peak-to-valley phase error residual has decreased by a factor of 17 and the standard deviation has decreased by a factor of 13.

The remaining error in FIG. 7 is due to the finite sampling of the carrier pattern, not the limited number of harmonics used in the correction. As the surface departure decreases, the number of fringes in the carrier pattern is reduced and the peaks in the carrier pattern spectrum (FIG. 6) broaden and contaminate neighboring frequencies. This remaining error can be reduced by recalling that the carrier patterns are a repeating series of identically distorted sinusoids, and that the distortion is purely due to the addition of odd harmonics. Thus a single cycle contains all the information needed for the correction and a Fourier series can be used to obtain the harmonic amplitudes rather than a Fourier transform. The strategy therefore is to collapse the carrier pattern into a single cycle by using the measured phase modulo $2\pi$ and then calculate the Fourier series of the resulting single cycle pattern.

Figure 8:
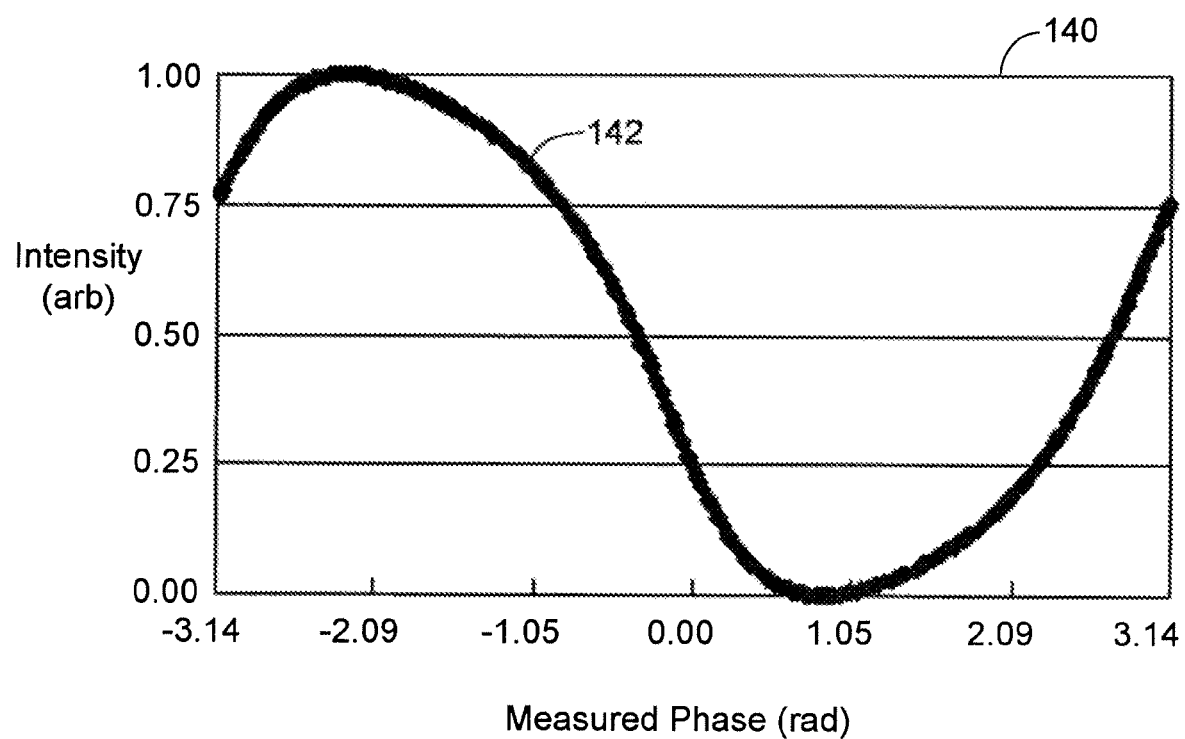
FIG. 8 is a graph that shows a single cycle of the carrier pattern in FIG. 6.

FIG. 8 is a graph 140 that shows the single cycle pattern 142 obtained from the same data used to generate the graph 110 in FIG. 5. The simulation only contained 1024 sampled points, but in practice the number of samples contained in this one cycle can be quite large, as high as 1 million for a 1000× 1000 imager.

Figure 9:
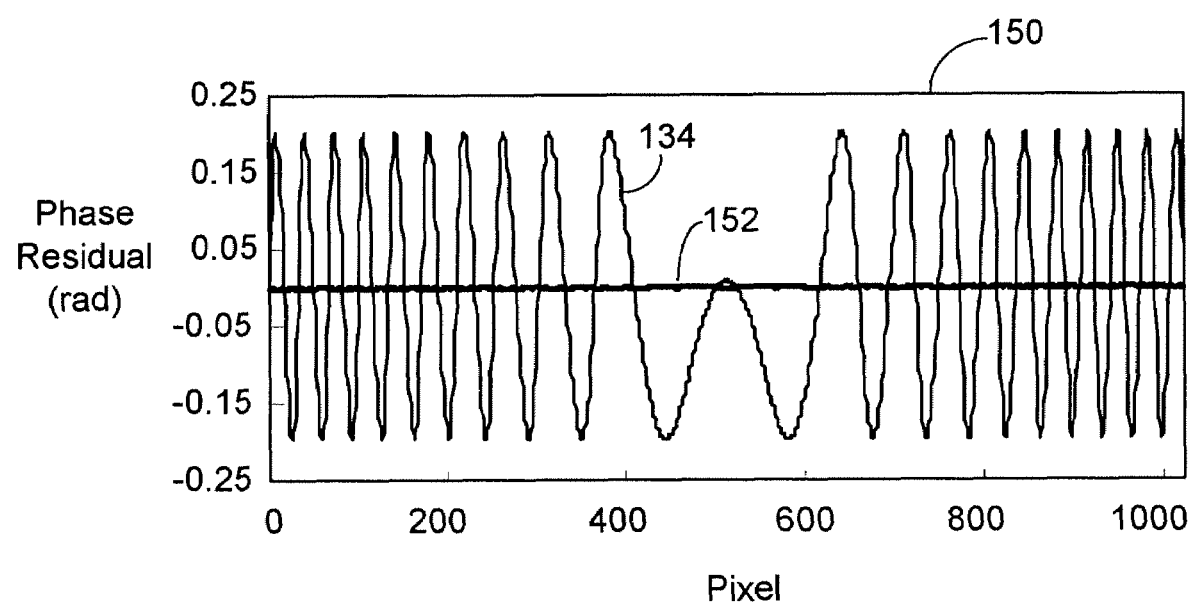
FIG. 9 is a graph showing residual phase errors.

FIG. 9 is a graph 150 showing a curve 152 representing the residual phase error obtained by replacing the Fourier transform harmonic amplitudes in Equ. 15 with Fourier series amplitudes. A lighter curve 134 representing the uncorrected residuals is shown for comparison. Graph 150 shows that the residual phase error is reduced significantly, with the RMS residual phase error of the corrected profile (represented by curve 152) a factor of 160 smaller than the uncorrected profile (represented by curve 134)—a 10× improvement over the use of the Fourier transform in this case. The remaining error stems from the approximation defined by Equ. 21.

Phase Error Sensitivity Function

The phase error sensitivity of the phase error correction method described above to vibrational frequency and amplitude was investigated through simulations. The phase error sensitivity is defined as the peak RMS surface residual normalized to the vibrational amplitude, so a sensitivity of one means that the RMS surface residual equals the amplitude of the vibrational disturbance that caused it. In order to fully assess the correction fidelity, the simulations do not include digitization or other stochastic error sources. A detector integration period of one frame period was assumed. The phase error sensitivity of the method is compared to two well known PSI algorithms, whose phase error sensitivity to small amplitude vibrations has been theoretically analyzed in "Vibration in phase shifting interferometry" by de Groot, Journal of the Optical Society of America A, 12(2), 354-365 (1995).

Figure 10A:
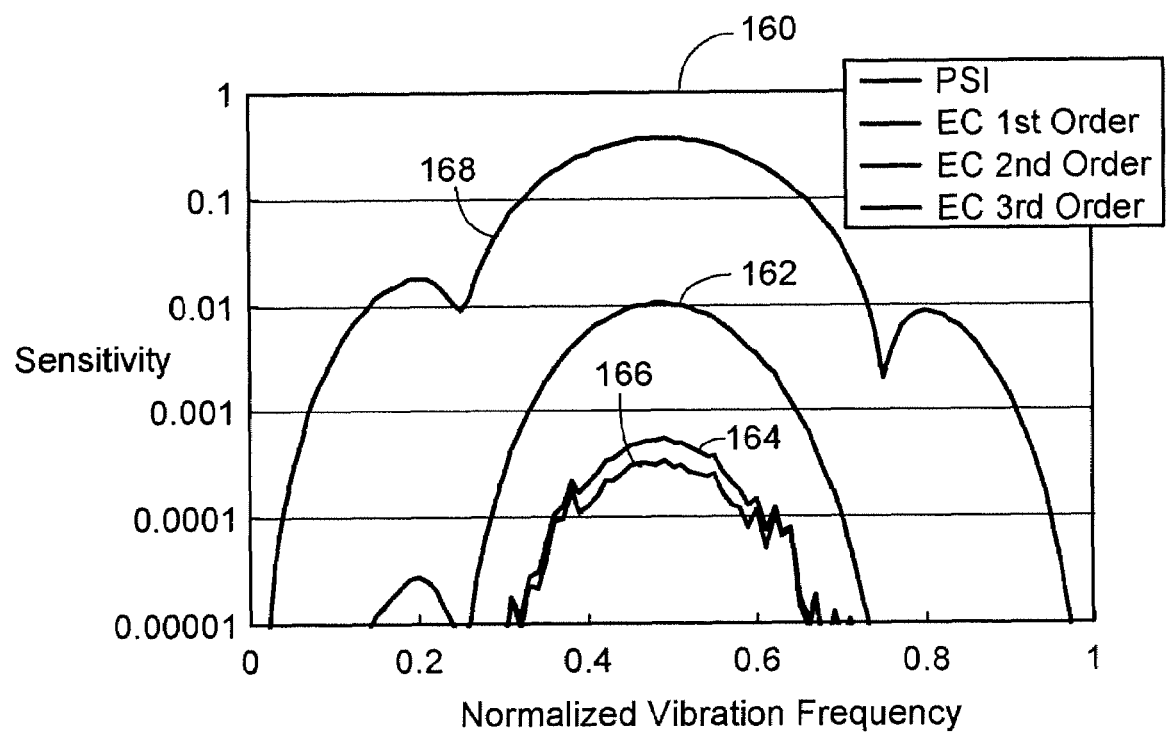
FIGS. 10A and 10B are graphs that show the phase error sensitivity functions for small amplitude vibrations. The curve with the highest sensitivity values is the PSI curve. The $1^{st}$, $2^{nd}$, and $3^{rd}$ order curves have decreasing respective sensitivity values at each vibration frequency.

FIG. 10A is a graph 160 that shows curves 162, 164, and 166 representing the phase error sensitivity functions for small amplitude vibrations (vibrations of order 10 nm amplitude) using the phase error correction method described above when a 7 frame PSI algorithm is used. A curve 168 representing the theoretical PSI sensitivity without using the phase error correction method described above is shown for comparison.

Figure 10B:
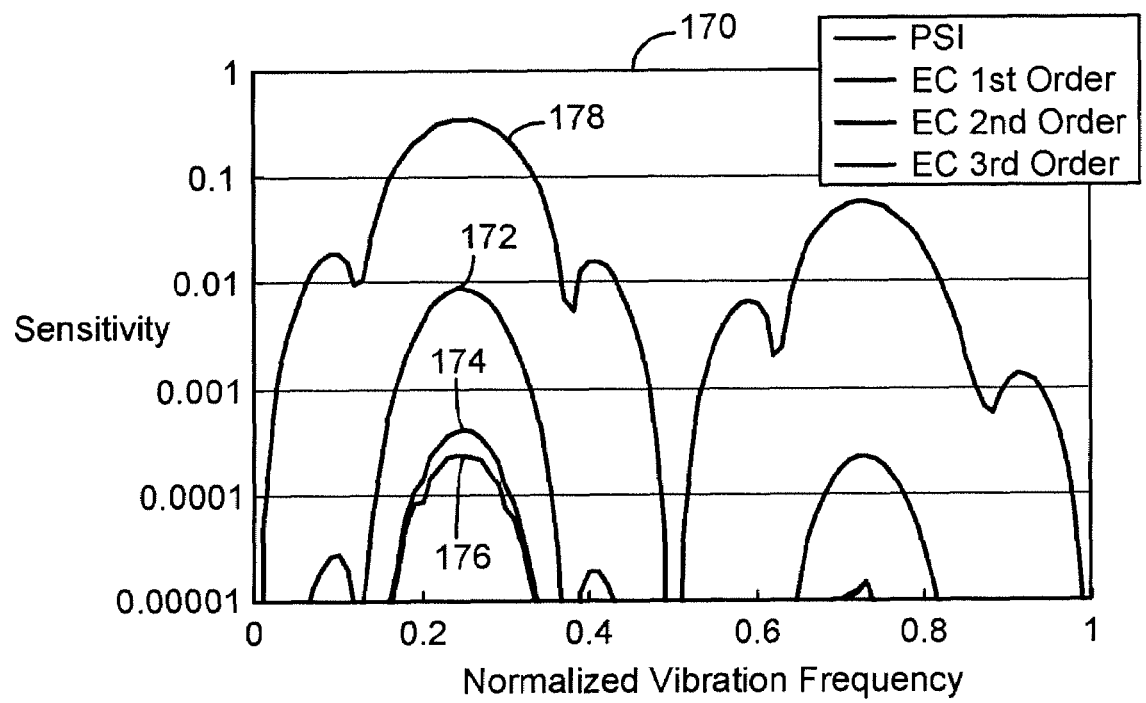

FIG. 10B is a graph 170 that shows curves 172, 174, and 176 representing the phase error sensitivity functions for small amplitude vibrations (vibrations of order 10 nm amplitude) using the phase error correction method described above when a 13 frame PSI algorithm is used. A curve 178 representing the theoretical PSI sensitivity without using the phase error correction method described above is shown for comparison.

In each of FIGS. 10A and 10B, the curves are plotted for frequencies from DC to the sample rate. Three different curves for the error correction method are shown, representing results when $1^{st}$ order, $2^{nd}$ order, and $3^{rd}$ order harmonic are used in the correction. The vibration frequency is normalized to the sample rate. The vibration amplitude was 1 radian.

FIGS. 10A and 10B show that the RMS phase error is reduced across the spectrum by over 2 orders of magnitude relative to both the 7 frame and 13 frame PSI algorithms if corrections to $2^{nd}$ order are calculated.

Figure 11A:
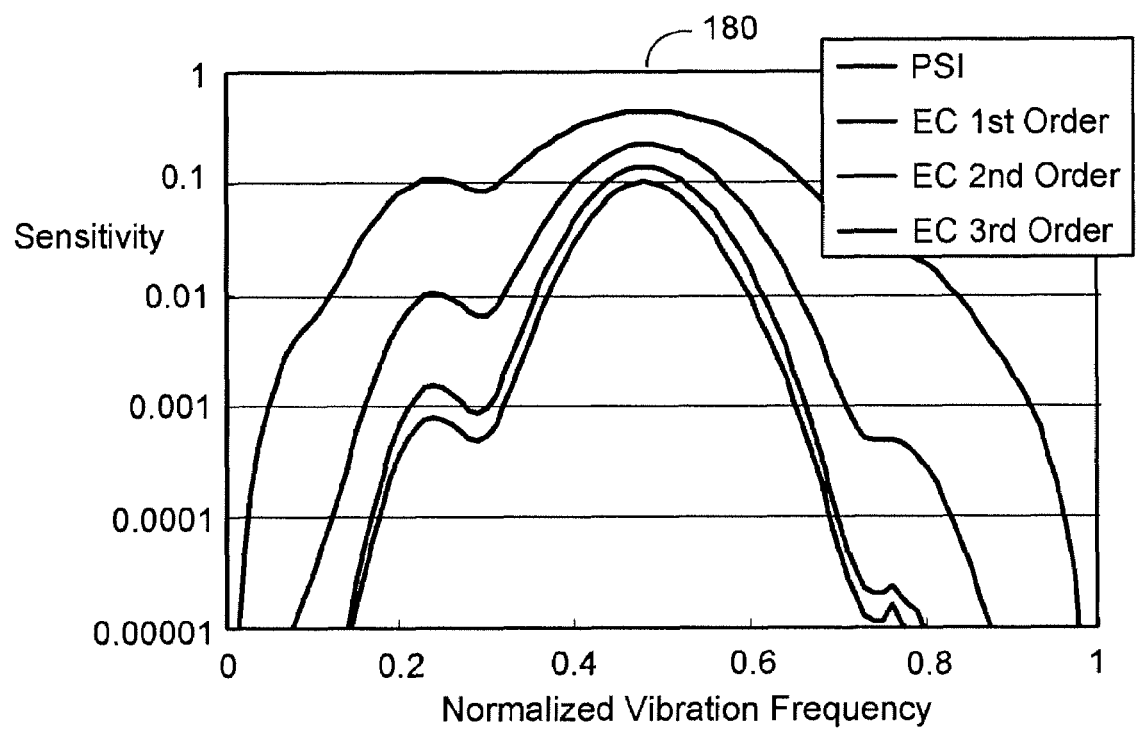
FIGS. 11A and 11B are graphs that show the phase error sensitivity functions for large amplitude vibrations. The curve with the highest sensitivity values is the PSI curve. The $1^{st}$, $2^{nd}$, and $3^{rd}$ order curves have decreasing respective sensitivity values at each vibration frequency.
Figure 11B:
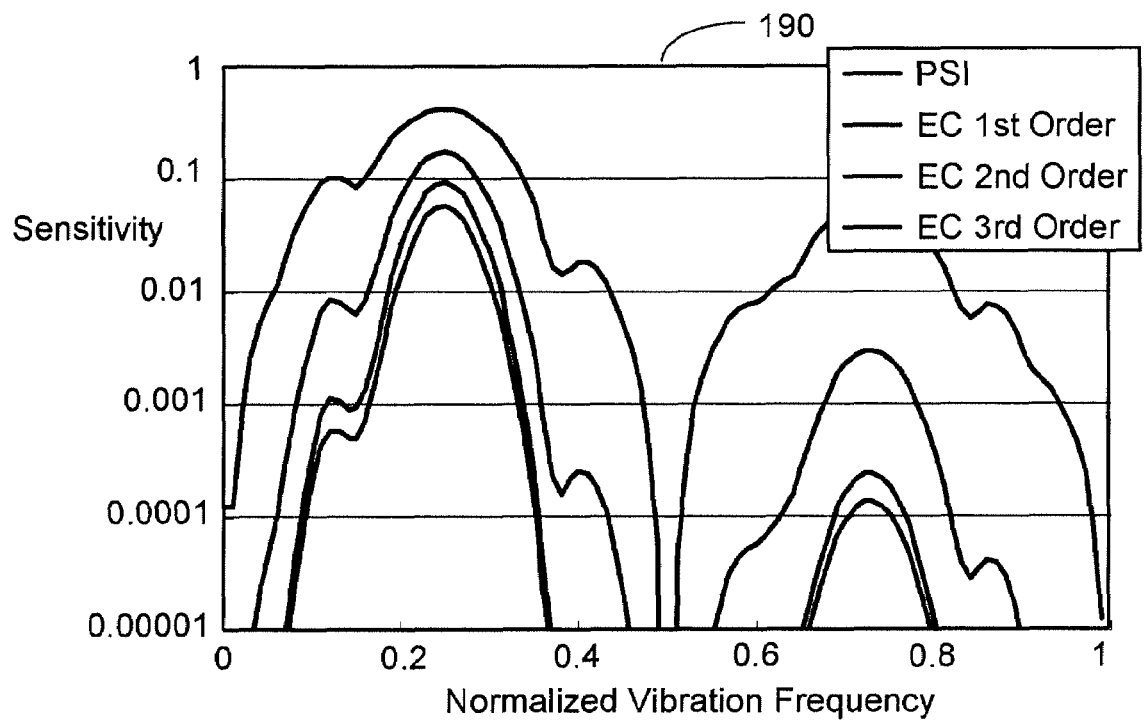

FIGS. 11A and 11B are graphs 160 and 170 that show curves representing the phase error sensitivity functions for large amplitude vibrations (but still small enough so that the PSI algorithm does not produce discontinuities) using the phase error correction method described above when a 7 frame PSI algorithm and a 13 frame PSI algorithm, respectively, are used. The vibration frequency is normalized to the sample rate. The vibration amplitude was 1 radian.

The graphs 160 and 170 show that the correction is less effective (as compared to when the vibration amplitude is small), producing a factor of 5 reduction in the RMS ripple for the 7-frame algorithm, and a factor of 9 for the 13-frame algorithm at the most sensitive vibration frequencies if corrections to $3^{rd}$ order are made. Vibration frequencies further away from the peaks are still well corrected.

Spatially Dependent Vibrations

The direct method described above assumes that the vibrations do not have spatial dependence, so the phase shift variations are assumed to be constant across the test surface. Though typically satisfied in practice, this can represent a limitation in some applications. Vibrationally induced test object angular motions can produce spatially dependent optical path changes in the interferometer that, though typically smaller than the pure piston term, can nevertheless degrade a PSI measurement.

The direct method can be modified to incorporate spatially dependent phase shifts by allowing the harmonic coefficients $g_k$ to acquire a spatial dependence. The phase map is then calculated with the direct method using a unique $g_k$ for each pixel. The spatial dependence of the harmonic coefficients is obtained by subdividing the image, with the additional requirement that each sub-image have at least one fringe of departure to develop a full cycle carrier pattern. Subdividing the image into quadrants is sufficient to remove most of the distortions due to interference cavity rigid body motions found in standard practice, so requiring one fringe per sub-image is not especially demanding. However, applying the direct method to each of the sub-images independently can produce banding artifacts in the phase map. Therefore, in both cases the spatial dependence of the harmonic coefficient is parametrized with a smooth functional, typically linear to account for test object tilts, but higher order dependencies can be handled with finer image subdivisions.

Spatially Dependent Harmonic Coefficients

Spatially dependent vibrations can be handled by allowing the harmonic coefficients $g_k$ to acquire a spatial dependence, which is conveniently accomplished by subdividing the image. In each sub-image the $g_k$ are assumed constant and found through Equ. 23, afterwards the spatial dependence is determined by fitting the coefficients found in each sub-image to a linear functional. The appropriate harmonic coefficients are then calculated for each pixel separately before applying Equ. 22 to calculate the phase.

To demonstrate the procedure, a 1-D simulation incorporated a linear variation in the phase shift amplitude, as one might expect to occur if the test surface tilted during phase shifting. Again a 7-frame PSI algorithm with nominally $\pi/2$ phase increments is used to calculate the initial phase profile. The peak vibration amplitude is again a rather large 1 radian at a normalized frequency of 0.2 in order to better illustrate the distortions. The analysis subdivides the phase profile into two halves, calculates the harmonic coefficients separately for each half and then fits the harmonic coefficient spatial variation to linear functional.

Figure 12:
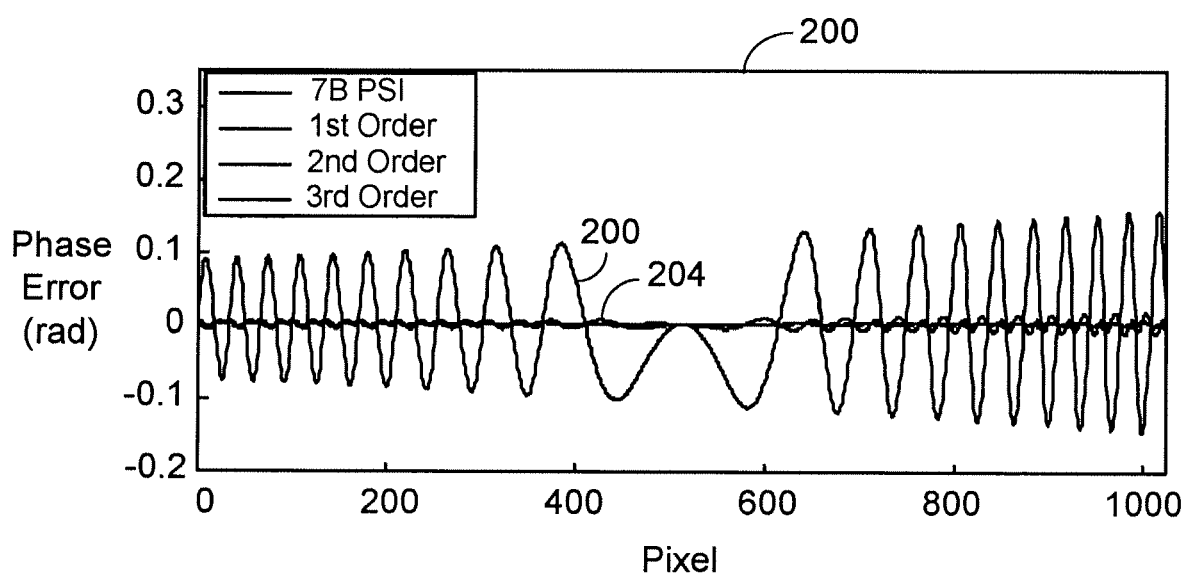
FIG. 12 is a graph showing phase error profiles.

FIG. 12 is a graph 200 showing a curve 202 representing the phase error profile using a 13 frame PSI algorithm, and a curve 204 representing the corrected phase map for three different values of the harmonic order. The simulation was performed assuming that the vibration amplitude varied linearly across the profile. The initial PSI phase error profile (curve 202) shows the spatial dependence of the vibration amplitude. The curve 202 shows an RMS phase error residual of 80 mrad. By comparison, the curve 204 shows that the RMS phase error of the $3^{rd}$ order corrected profile was 1.5 mrad.

Measurement Examples

To test the phase error correction method described above, a number of measurements of tilted flats with a commercial phase shifting interferometer (Zygo GPI XP/D®) were made, and the raw intensity data was transferred to another computer which analyzed the data with the direct method using Mathcad 11®. The measurements used the 13 frame algorithm for the standard PSI result. Over 50 measurements were made with various values for the frame integration while the test surface mount was physically handled to impart vibrations. In all cases the method eliminated the characteristic ripple at twice the fringe frequency associated with vibrationally induced phase errors.

FIG. 13A is a graph 210 showing a surface profile determined using the 13-frame PSI algorithm. FIG. 13B is a graph 220 showing a corrected surface profile determined using the direct method to the $3^{rd}$ order. FIG. 13C is a graph 230 showing the direct method using 4 quadrants to account for spatially dependent vibrations.

FIG. 14A is a graph 240 showing another surface profile determined using the 13-frame PSI algorithm. FIG. 14B is a graph 250 showing a corrected surface profile determined using the direct method to the 3rd order. FIG. 15C is a graph 260 showing the direct method using 4 quadrants to account for spatially dependent vibrations.

Additional Factors that may Affect Measurement

The following describes some of the factors that can affect algorithm performance or the measurement of the test object surface profile, and ways to compensate for the adverse effects, if any.

One factor that may be considered is the spatial intensity variation. When using the interferometry methods described above, it is useful to compensate for spatial dependence of the illumination intensity or intensity sensitivity non-uniformity prior to calculating spectra. Otherwise, the bandwidth of these features may overlap the spatial frequencies of interest and distort the signal. The detector 59 can be a high quality camera having high sensitivity uniformity. If necessary, measuring spatial dependence of the illumination intensity or intensity sensitivity non-uniformity can be performed in a pre-calibration step. Additional processing can be used to compensate for variances in reflectivity of the surfaces of the reference object 58 and the test object 53.

Another factor that may be considered is the mis-calibration of the scan mechanism (either the transducer 63 or the drive electronics 64). Phase shifter mis-calibration may be a source of error in phase shifting interferometry. From the point of view of the carrier pattern technique, a phase shifter mis-calibration is similar to a low frequency vibration, so as long as the mis-calibration is not severe enough to produce phase discontinuities in the PSI algorithm, the technique described above will be able to compensate for these types of errors.

Another factor that may be considered is random broadband intensity noise. Random broadband intensity noise (e.g. digitization noise) raises the noise floor of the carrier pattern spectrum and decreases the utility of the higher order harmonics in the compensation since they have lower amplitude. Thus, broadband noise affects the vibration compensation fidelity. The surface profile broadband noise characteristics are defined by the PSI algorithm employed and are not influenced by carrier pattern processing.

Additional Examples

Any of the methods described above can be implemented, for example, in computer hardware, software, or a combination of both. The methods can be implemented in computer programs using standard programming techniques following the descriptions herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

Other aspects, features, and advantages are within the scope of the invention.

What is claimed is:

1. A method comprising:
providing scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position;
temporally transforming at least some of the interference signals into a first frequency domain signal;
determining an estimate of a phase profile of the test object based on the first frequency domain signal;
determining a carrier pattern based on a data set for a particular scan position, the carrier pattern representing a relation between the intensity of data points in the data set and the estimated phase associated with the data points;
determining phase shifts at the multiple scan positions based on the estimated phase profile; and
determining a more accurate phase profile of the test object based on the estimated phase profile and the phase shifts experienced at the multiple scan positions.

2. The method of claim 1, further comprising transforming the carrier pattern into a second frequency domain signal with respect to the estimated phase.

3. The method of claim 2, wherein determining phase shifts at the multiple scan positions comprises determining phase shifts experienced at the multiple scan positions based on spectral coefficients of the second frequency domain signal.

4. The method of claim 1, wherein the multiple scan positions are obtained by varying an optical path length between light reflected from the test object and light reflected from a reference object of an interferometer used to acquire the scanning interferometry data.

5. The method of claim 4, wherein the optical path length variations between adjacent scan positions are non-uniform.

6. The method of claim 1, wherein the multiple scan positions are obtained by varying a wavelength of light used by an interferometer in acquiring the scanning interferometry data.

7. A method comprising:
providing scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position;
transforming at least some of the interference signals into a first frequency domain signal;
determining an estimate of a phase profile of the test object based on the first frequency domain signal;
determining a carrier pattern based on a data set for a particular scan position, the carrier pattern representing a relation between the intensity of data points in the data set and the phase associated with the data points; and
determining a correction to the estimate of the phase profile from the carrier pattern.

8. The method of claim 7, further comprising determining phase shifts at the multiple scan positions based on spectral coefficients of the carrier pattern.

9. The method of claim 8, further comprising determining the spectral coefficients of the carrier pattern by transforming the carrier pattern into a second frequency domain signal with respect to the estimated phase.

10. The method of claim 8, further comprising determining a more accurate phase profile of the test object based on the estimated phase profile and the phase shifts at the multiple scan positions.

11. The method of claim 7, wherein the scanning interferometry data were acquired using a narrow band light source having a center frequency and the light source has a spectral width less than 1% of the center frequency.

12. The method of claim 7, wherein determining the correction comprises performing a one-dimensional transformation of the carrier pattern.

13. The method of claim 7, wherein determining an estimate of a phase profile comprises determining a phase of a fundamental frequency of an oscillation of the interference signal.

14. The method of claim 7, wherein the multiple scan positions are obtained by varying an optical path length between light reflected from the test object and light reflected from a reference object of an interferometer used to acquire the scanning interferometry data.

15. The method of claim 14, wherein the optical path length variations between adjacent scan positions are non-uniform.

16. The method of claim 7, wherein the multiple scan positions are obtained by varying a wavelength of light used by an interferometer in acquiring the scanning interferometry data.

17. A method comprising:
choosing a phase shifting interferometry (PSI) algorithm that uses a finite number N of phase shifted intensity values;
acquiring N interferograms at different times corresponding to the phase shifts used by the chosen PSI algorithm, each interferogram represented by intensity measurements at a variety of spatial locations;
determining a first surface phase profile using the chosen PSI algorithm;
determining phase shift information based on at least one carrier pattern for at least one of the interferograms, wherein the carrier pattern represents a relation between the intensity of data points in one of the interferograms and the phase associated with the data points; and
correcting the surface phase profile for errors related to imperfect phase shifts based on the phase shift information.

18. The method of claim 17, wherein each interferogram is acquired for a different optical path length between light reflected from the test object and light reflected from a reference object of an interferometer used to acquire the scanning interferometry data.

19. A system, comprising:
an interferometer configured to provide scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position; and
a processor configured to:
transform at least some of the interference signals into a frequency domain signal;
determine an estimate of a phase profile of the test object based on the frequency domain signal;
determine a carrier pattern based on a data set for a particular scan position, the carrier pattern representing a relation between the intensity of data points in the data set and the estimated phase associated with the data points;
determine phase shifts experienced at the multiple scan positions, and
determine a more accurate phase profile of the test object based on the estimated phase profile and the phase shifts experienced at the multiple scan positions.

20. The system of claim 19, further comprising a narrow band light source having a spectral width less than 1% of a center frequency, the light source being used in providing the scanning interferometry data.

21. The system of claim 19, wherein the processor is further configured to transform the carrier pattern into a second frequency domain signal with respect to the estimated phase.

22. The system of claim 21, wherein the processor determines phase shifts at the multiple scan positions based on spectral coefficients of the second frequency domain signal.

23. The system of claim 19, further comprising a scan mechanism configured to vary the scan positions by varying an optical path length between light reflected from the test object and light reflected from a reference object of the interferometer.

24. The system of claim 19, further comprising a scan mechanism configured to vary the scan positions by varying a wavelength of light used by the interferometer for the phase shifting interferometry.

25. A system, comprising:
an interferometer configured to provide scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position; and
a processor configured to:
transform at least some of the interference signals into a first frequency domain signal;
determine an estimate of a phase profile of the test object based on the frequency domain signal; and
determine a carrier pattern based on a data set for a particular scan position, the carrier pattern representing a relation between the intensity of data points in the data set and the phase associated with the data points.

26. The system of claim 25, further comprising a narrow band light source having a spectral width less than 1% of a center frequency, the light source being used in providing the scanning interferometry data.

27. The system of claim 25, wherein the processor is further configured to transform the carrier pattern into a second frequency domain signal with respect to the estimated phase.

28. The system of claim 27, wherein the processor is further configured to determine phase shifts at the multiple scan positions based on spectral coefficients of the second frequency domain signal.

29. The system of claim 28, wherein the processor is further configured to determine a more accurate phase profile of the test object based on the estimated phase profile and the phase shifts at the multiple scan positions.

30. The system of claim 25, further comprising a scan mechanism configured to vary the scan positions by varying an optical path length between light reflected from the test object and light reflected from a reference object of the interferometer.

31. The system of claim 25, further comprising a scan mechanism configured to vary the scan positions by varying a wavelength of light used by the interferometer for the phase shifting interferometry for the phase shifting interferometry.

32. A method comprising:
providing scanning interferometry data for a test object using phase shifting interferometry, the data comprising intensity values for each of multiple scan positions for each of different spatial locations of the test object, the intensity values for each spatial location defining an interference signal for the spatial location, the intensity values for a common scan position defining a data set for that scan position;
determining an estimate of a phase profile of the test object based on at least some of the interference signals, the phase profile comprising a phase height for each of the spatial locations;
determining a carrier pattern based on the intensity value corresponding to each spatial location for a common scan position and the phase height for each spatial location; and determining information about the test object based on the interferometry data and the carrier pattern.

33. The method of claim 32, wherein determining the estimate of the phase profile comprises temporally transforming at least some of the interference signals into a first frequency domain signal and determining the estimate from the first frequency domain signal.

34. The method of claim 32, wherein determining the information comprises using the carrier pattern to reduce contributions to the inferometry data due to vibrations present in an interferometry system used to acquire the scanning interferometry data.

35. The method of claim 34, wherein the contributions are reduced based on variations of the carrier pattern from a sinusoidal function.

36. The method of claim 35, wherein reducing the contributions comprises determining a frequency spectrum of the carrier pattern.

37. The method of claim 36, wherein reducing the contributions comprises determining a corrected phase map based on the frequency spectrum.

38. The method of claim 37, wherein the corrected phase map is determined based on odd multiples of a fundamental frequency of the sinusoidal function.

* * * * *

UNITED STATES PATENT AND TRADEMARK OFFICE
CERTIFICATE OF CORRECTION

PATENT NO. : 7,710,580 B2  Page 1 of 1
APPLICATION NO. : 11/924688
DATED : May 4, 2010
INVENTOR(S) : Leslie L. Deck It is certified that error appears in the above-identified patent and that said Letters Patent is hereby corrected as shown below:

Column 20, claim 31, line 49, after "shifting interferometry" delete "for the phase shifting interferometry".

Signed and Sealed this

Thirteenth Day of July, 2010

David J. Kappos
*Director of the United States Patent and Trademark Office*